(12) United States Patent
Tao et al.

(10) Patent No.: US 7,049,046 B2
(45) Date of Patent: May 23, 2006

(54) INFRARED ABSORBING COMPOUNDS AND THEIR USE IN IMAGEABLE ELEMENTS

(75) Inventors: Ting Tao, Fort Collins, CO (US); Scott A. Beckley, Windsor, CO (US); Shashikant Saraiya, Parlin, NJ (US); Heidi M. Munnelly, Windsor, CO (US)

(73) Assignee: Eastman Kodak Company, Rochester, NY (US)

( * ) Notice: Subject to any disclaimer, the term of this patent is extended or adjusted under 35 U.S.C. 154(b) by 24 days.

(21) Appl. No.: 10/813,221

(22) Filed: Mar. 30, 2004

(65) Prior Publication Data

US 2005/0221215 A1    Oct. 6, 2005

(51) Int. Cl.
*G03F 7/004* (2006.01)

(52) U.S. Cl. .............. 430/270.1; 430/281.1; 430/302; 560/222

(58) Field of Classification Search ......... 430/270.1, 430/281.1, 302; 560/222
See application file for complete search history.

(56) References Cited

U.S. PATENT DOCUMENTS

| | | | |
|---|---|---|---|
| 4,565,769 A | 1/1986 | Dueber et al. | |
| 4,745,214 A * | 5/1988 | Hess et al. | 560/222 |
| 5,260,480 A * | 11/1993 | Lacroix et al. | 560/222 |
| 5,372,907 A | 12/1994 | Haley et al. | |
| 5,919,601 A | 7/1999 | Nguyen et al. | |
| 5,965,319 A | 10/1999 | Kobayashi | |
| 6,090,532 A | 7/2000 | West et al. | |
| 6,124,425 A | 9/2000 | Nguyen | |
| 6,159,657 A * | 12/2000 | Fleming et al. | 430/270.1 |
| 6,171,422 B1 * | 1/2001 | Cahill et al. | 156/150 |
| 6,177,182 B1 | 1/2001 | Nguyen | |
| 6,280,899 B1 | 8/2001 | Parsons | |
| 6,387,595 B1 | 5/2002 | Teng | |
| 6,397,749 B1 | 6/2002 | Kita et al. | |
| 6,413,694 B1 | 7/2002 | Zheng et al. | |
| 6,417,249 B1 * | 7/2002 | Nguyen et al. | 523/201 |
| 6,423,469 B1 * | 7/2002 | DoMinh et al. | 430/270.1 |
| 6,451,500 B1 | 9/2002 | Leon | |
| 6,461,804 B1 | 10/2002 | Deroover | |
| 6,465,152 B1 | 10/2002 | DoMinh et al. | |
| 6,506,533 B1 | 1/2003 | Kottmair et al. | |
| 6,511,782 B1 | 1/2003 | Vermeersch et al. | |
| 6,521,730 B1 * | 2/2003 | Pabon et al. | 526/245 |
| 6,521,782 B1 * | 2/2003 | Riondel et al. | 560/222 |
| 6,537,730 B1 * | 3/2003 | Fleming et al. | 430/302 |
| 6,554,418 B1 * | 4/2003 | Lawrence et al. | 347/105 |
| 6,558,872 B1 | 5/2003 | Ray et al. | |
| 6,579,662 B1 * | 6/2003 | Zheng et al. | 430/281.1 |
| 6,582,882 B1 | 6/2003 | Pappas et al. | |
| 6,596,469 B1 | 7/2003 | McCullough et al. | |
| 6,623,908 B1 * | 9/2003 | Zheng et al. | 430/270.1 |
| 6,660,449 B1 * | 12/2003 | Zheng et al. | 430/270.1 |
| 6,762,223 B1 * | 7/2004 | West et al. | 524/44 |
| 6,777,164 B1 | 8/2004 | Horne et al. | |
| 6,809,216 B1 * | 10/2004 | Bradley et al. | 560/223 |
| 2001/0008740 A1 | 7/2001 | Kita et al. | |
| 2003/0064318 A1 | 4/2003 | Huang et al. | |

FOREIGN PATENT DOCUMENTS

| | | | |
|---|---|---|---|
| EP | 329512 A1 * | 8/1989 | |
| EP | 428970 A1 * | 5/1991 | |
| EP | 1114734 A1 * | 7/2001 | |
| EP | 1253137 A1 * | 10/2002 | |
| WO | WO 00/17711 | 3/2000 | |

* cited by examiner

*Primary Examiner*—Amanda Walke
(74) *Attorney, Agent, or Firm*—J. Lanny Tucker

(57) ABSTRACT

Infrared absorbing compounds are disclosed. The compounds are co-polymers that comprise covalently attached ammonium, sulfonium, phosphonium, and/or iodonium cations, and infrared absorbing cyanine anions that have two to four sulfonate groups and/or sulfate groups, and/or infrared absorbing oxonol anions. The infrared absorbing compounds can be used in aqueous developable lithographic printing plate precursors.

26 Claims, No Drawings

INFRARED ABSORBING COMPOUNDS AND THEIR USE IN IMAGEABLE ELEMENTS

FIELD OF THE INVENTION

The invention relates to lithographic printing. In particular, this invention relates to infrared absorbing compounds and their use in imageable elements useful as lithographic printing plate precursors.

BACKGROUND OF THE INVENTION

In lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material.

Conventionally, imaging of the imageable element with ultraviolet and/or visible radiation has been carried out through a mask, which has clear and opaque regions. However, direct digital imaging, which obviates the need for imaging through a mask, is becoming increasingly important in the printing industry. Thermally imageable elements that are to be imaged with infrared radiation, such as with a laser or an array of lasers emitting modulated near infrared or infrared radiation in the range of about 800 nm to about 1200 nm typically about 830 nm, about 1056 nm, or about 1064 nm, typically comprise an infrared absorber known as a photothermal conversion material. Photothermal conversion materials absorb radiation and convert it to heat.

These imageable elements typically require processing in a developer to convert them to lithographic printing plates. Developers are typically aqueous alkaline solutions, which may also contain substantial amounts of organic solvents. Because of their high pH and the presence of organic solvents, disposal of substantial quantities of developer is expensive and can cause environmental problems. Processing of the imaged imageable element in a developer also introduces additional costs in, for example, the cost of the developer, the cost of the processing equipment, and the cost of operating the process.

On-press developable lithographic printing plate precursors can be directly mounted on a press after imaging and developed with ink and/or fountain solution during the initial press operation. These precursors do not require a separate development step before mounting on press. On press imaging, in which the precursor is both imaged and developed on press, eliminates mounting the precursor in a separate imaging device. On-press developable thermally imageable elements require compounds that absorb infrared radiation and are soluble in, or removable by, fountain solution.

Thus, a need exists for infrared absorbers for imageable elements that do not require developers that have a high pH and/or contain organic solvent. Preferably, these infrared absorbers are soluble in or removable by ink and/or fountain solution so that they may be used in on press developable imageable elements.

SUMMARY OF THE INVENTION

In one aspect, the invention is infrared absorbing compound. The infrared absorbing compound is a co-polymer comprising x wt % of K units, y wt % of L units, and z wt % of M units, in which:

(i) K is selected from —[$CH_2C(R^1)R^2$]—, —[$CH_2CR^1(CO_2R^3)$]—, —[$CH_2CR^1(CONR^3{}_2)$]—, —[—CH(COECO)CH—]—, and mixtures thereof;

(ii) L is —[$CH_2C(R^4)CO_2B_nT$]—; and (iii) M is —[$CH_2C(R^4)(-Q-G^{\oplus})(D^{\ominus})$]- or —[$CH_2C(R^4)(G^{\oplus})(D^{\ominus})$]-;

in which:

$x+y+z$=about 100 wt %;

each $R^1$ is independently hydrogen, alkyl of one to six carbon atoms, phenyl, substituted phenyl, or cyano; each $R^2$ is independently hydrogen, alkyl of one to six carbon atoms, phenyl, substituted phenyl, halogen, cyano, alkoxy of one to four carbon atoms, acyl of one to five carbon atoms, acyloxy of one to five carbon atoms, allyl, —$CH_2CH_2OCH_2CH_3$, —$CH_2CH_2SO2CH_3$, —NHC(O)H, —NHC(O)$CH_3$, —Si($CH_3$)$_3$, —Si(O$CH_3$)$_3$, or a cyclic —[NC(O)$CH_2CH_2CH_2$] group; or $R^1$ and $R^2$ together are —$CH_2C(O)OC(O)$—, —($CH_2$)$_2C(O)OC(O)$—, or —$CH_2C(O)OC(O)CH_2$—;

each $R^3$ is independently hydrogen, alkyl of one to six carbon atoms, or phenyl;

each $R^4$ is independently hydrogen, alkyl of one to six carbon atoms, phenyl, substituted phenyl, or cyano;

E is oxygen or $NR^6$ in which each $R^6$ is hydrogen, hydroxyl, phenyl, substituted phenyl, alkyl of one to six carbon atoms, or benzyl;

B is selected from —$CH_2$—CH($R^5$)—O— and —$CH_2$—C($R^5$)(OH)—, in which each $R^5$ is independently hydrogen or alkyl of one to six carbon atoms;

n is about 5 to about 400;

T is hydrogen, alkyl of one to eight carbon atoms, or phenyl;

Q is —$CO_2(CH_2)_m$—, —$CONH(CH_2)_m$—, —($CH_2$)$_m$—, —$CO_2C_6H_4$—, in which m is 1 to 5;

$G^{\oplus}$ is selected from ammonium, sulfonium, phosphonium, and iodonium; and $D^{\ominus}$ is selected from the group consisting of infrared absorbing cyanine anions that have a total of two to four groups selected from sulfonate groups, sulfate groups, and mixtures thereof; infrared absorbing oxonol anions; and mixtures thereof.

In another aspect, the invention is an imageable element comprising an imageable layer over a substrate, in which the imageable layer comprises the infrared absorbing compound. In another aspect, the invention is a method for forming an image by thermally imaging the imageable element and developing it to form the image.

DETAILED DESCRIPTION OF THE INVENTION

Unless otherwise indicated, the terms infrared absorbing compound, infrared absorbing cyanine anion, infrared absorbing oxonol anion, co-binder, monomer, free radical generator, coating solvent, and similar terms also include mixtures of such materials. Thermal imaging refers to imaging with a hot body, such as a thermal head, or with infrared radiation. Unless otherwise specified, all percentages are percentages by weight.

Infrared Absorbing Compounds

The infrared absorbing compounds are co-polymers that comprise three units: K, L, and M. The infrared absorbing compounds comprise x wt % of the K unit, y wt % of the L unit, and z wt % of the M unit. x+y+z is equal to about 1, typically 1. x is typically about 30 wt % to about 98 wt %, preferably about 60 wt % to about 98 wt %; y is typically about 1 wt % to about 50 wt %, preferably about 2 wt % to about 30 wt %; and z is typically about 1 wt % to about 50 wt %, preferably about 2 wt % to about 30 wt %, based on the weight of the co-polymer.

The K unit is selected from —[CH$_2$C(R$^1$)R$^2$]—, —[CH$_2$CR$^1$(CO$_2$R$^3$)]—, —[CH$_2$CR$^1$(CONR$^3{}_2$)]—, —[—CH(COECO)CH—]—, and mixtures thereof. Each R$^1$ is independently hydrogen, alkyl of one to six carbon atoms, phenyl, substituted phenyl, or cyano. Each R$^2$ is independently hydrogen, alkyl of one to six carbon atoms, phenyl, substituted phenyl, halogen, cyano, alkoxy of one to four carbon atoms, acyl of one to five carbon atoms, acyloxy of one to five carbon atoms, allyl, —CH$_2$CH$_2$OCH$_2$CH$_3$, —CH$_2$CH$_2$SO2CH$_3$, —NHC(O)H, —NHC(O)CH$_3$, —Si (CH$_3$)$_3$, —Si(OCH$_3$)$_3$, or a cyclic —[NC(O)CH$_2$CH$_2$CH$_2$] group; or R$^1$ and R$^2$ together are —CH$_2$C(O)OC(O)—, —(CH$_2$)$_2$C(O)OC(O)—, or —CH$_2$C(O)OC(O)CH$_2$—. Each R$^3$ is independently hydrogen, alkyl of one to six carbon atoms, or phenyl. R$^1$ is typically hydrogen or methyl. R$^2$ is typically phenyl or cyano. R$^3$ is typically methyl.

—[CH(COECO)CH]— represents a cyclic anhydride or cyclic imide structure, such as is found in itaconic anhydride or in N-phenyl maleimide. That is, the first and last carbon atoms are bonded by a carbon-carbon single bond. E is oxygen or NR$^6$ in which each R$^6$ is hydrogen, phenyl, substituted phenyl, alkyl of one to six carbon atoms, or benzyl. E is typically oxygen or NR$^6$ in which R$^6$ is hydrogen, phenyl, cyclohexyl, or benzyl.

—[NC(O)CH$_2$CH$_2$CH$_2$] represents the cyclic lactam structure found in caprolactam and in N-vinyl caprolactam. That is, the nitrogen atom and the last carbon atom are bonded by a carbon-nitrogen single bond.

Alkyl groups of one to six carbon atoms, include, for example, methyl, ethyl, n-propyl, iso-propyl, n-butyl, sec-butyl, iso-butyl, t-butyl, n-pentyl, iso-pentyl, neo-pentyl, n-hexyl, iso-hexyl, 1,1-dimethyl-butyl, 2,2-dimethyl-butyl, cyclopentyl, and cyclohexyl. Substituted phenyl groups include, for example, 4-methylphenyl, 3-methylphenyl, 4-methoxyphenyl, 4-cyanophenyl, 4-chlorophenyl, 4-fluorophenyl, 4-acetoxyphenyl, and 3,5-dichlorophenyl. Halogen includes fluoro (F), chloro (Cl), and bromo (Br). Alkoxy groups of one to four carbon atoms include, for example, methoxy, ethoxy, n-propoxy, iso-propoxy, n-butoxy, and t-butoxy. Acyl of one to five carbon atoms include, for example, H$_3$CO— (acetyl), CH$_3$CH$_2$CO—, CH$_3$(CH$_2$)$_2$CO—, CH$_3$(CH$_2$)$_3$CO—, and (CH$_3$)$_3$CCO—. Acyloxy of one to five carbon atoms include, for example, H$_3$CC(O)O— (acetyloxy), CH$_3$CH$_2$C(O)O—, CH$_3$(CH$_2$)$_2$C(O)O—, CH$_3$(CH$_2$)$_3$C(O)O—, and (CH$_3$)$_3$CC(O)O—.

The L unit is —[CH$_2$C(R$^4$)CO$_2$B$_n$T]-. Each R$^4$ is independently hydrogen, alkyl of one to six carbon atoms, phenyl, substituted phenyl, or cyano. B is selected from —CH$_2$—CH(R$^5$)—O— and —CH$_2$—C(R$^5$)(OH)—, in which R$^5$ is hydrogen or alkyl of one to six carbon atoms. T is hydrogen, phenyl, or an alkyl of one to eight carbon atoms. Alkyl groups of one to six carbon atoms are listed above. Alkyl groups of one to eight carbon atoms additionally include, for example, n-hexyl, 2-ethylhexyl, 2,2,4-trimethylpentyl, and n-octyl. R$^4$ is typically hydrogen or methyl, more typically methyl. B is typically —CH$_2$—CH(R$^5$)—O— in which R$^5$ is typically hydrogen, methyl, or a mixture of hydrogen and methyl, more typically hydrogen. T is typically hydrogen, methyl, ethyl, or n-butyl. n is about 5 to about 400, typically about 10 to about 100.

M is —[CH$_2$C(R$^4$)(-Q-G$^\oplus$)(D$^\ominus$)]- or —[CH$_2$C(R$^4$)(G$^\oplus$)(D$^\ominus$)]-. Q is —CO$_2$(CH$_2$)$_m$—, —CONH(CH$_2$)$_m$—, —(CH$_2$)$_m$—, —CO$_2$C$_6$H$_4$—, or —C$_6$H$_4$—, in which m is one to five, preferably two to five. The phenylene group (—C$_6$H$_4$—) may be o-, m-, or p-substituted. G$^\oplus$ is an onium group selected from ammonium, including substituted ammonium, such as —N$^\oplus$(CH$_3$)$_3$, sulfonium, including substituted sulfonium, such as —S$^\oplus$(CH$_3$)$_2$, phosphonium, including substituted phosphonium, such as —P$^\oplus$(CH$_3$)$_3$, and iodonium, including substituted phosphonium, such as —I$^\oplus$C$_6$H$_5$. Q is typically —CO$_2$(CH$_2$)$_2$— or —CO$_2$(CH$_2$)$_3$—. G$^\oplus$ is typically ammonium, more typically trimethyl ammonium.

D$^\ominus$ is selected from infrared absorbing cyanine anions having two to four sulfonate and/or sulfate groups and infrared absorbing oxonol anions. Mixtures of these anions may also be used. Dyes that contain infrared absorbing cyanine anions having two to four sulfonate and/or sulfate groups and dyes that contain infrared absorbing oxonol anions are well known and have been described in numerous patents and publications.

A typical infrared absorbing cyanine anions that contain two to four sulfonate groups is IR dye A, whose structure is shown in the Examples. Other infrared absorbing cyanine anions that contain two to four sulfonate groups are disclosed, for example, in West, U.S. Pat. No. 5,107,063; Pearce, U.S. Pat. No. 5,972,838; Chapman, U.S. Pat. No. 6,187,502; Fabricius, U.S. Pat. No. 5,330,884; and Japanese Laid Open Application No. 63-033477, the disclosures of all of which are incorporated herein by reference. Fabricius, for example, discloses cyanine dyes of the general structure:

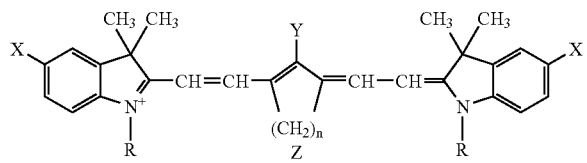

in which R may be an alkyl group substituted with a sulfonate group, such as —(CH$_2$)$_2$SO$_3$$^-$, —(CH$_2$)$_3$SO$_3$$^-$, or —(CH$_2$)$_4$SO$_3$$^-$; X may be a sulfonate group; Y is an aryl group, a substituted aryl group, or a heterocyclic group; and Z is one to three cations, depending on the number of sulfonate groups present in the anion. Methods for the preparation of infrared absorbing anions that contain sulfonate groups are disclosed in U.S. patent application Ser. No. 10/353,106, filed Jan. 27, 2003, incorporated herein by reference.

Infrared absorbing cyanine compound that contains N-alkyl sulfate groups are disclosed in U.S. patent application Ser. No. 10/736,364, filed Dec. 15, 2003, incorporated herein by reference. The compounds have general formula (I):

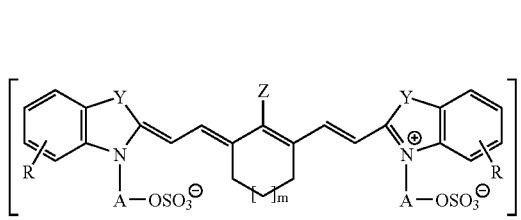

I in which: R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group; A is $(CH_2)_n$; where n is 1–5; preferably 2–4; Y is O, S, NR', or $C(R')_2$, where R' is hydrogen or alkyl; preferably methyl; Z is hydrogen, halogen, alkyl, substituted or unsubstituted aralkyl; substituted or unsubstituted aroxyl, substituted or unsubstituted thioaroxyl, or substituted or unsubstituted diphenylamino; m is zero or one; and X is a cation, preferably sodium, potassium, lithium, ammonium, or substituted ammonium. A typical compound is IR Dye B, whose preparation is shown in Example 8, below.

Infrared absorbing N-alkyl sulfate cyanine compounds can be synthesized by following procedure. In the first step, a heterocyclic amine of structure II is reacted with a cyclic sulfate of structure III in organic solvent, such as xylene, at above 100° C. to form an inner salt of structure IV.

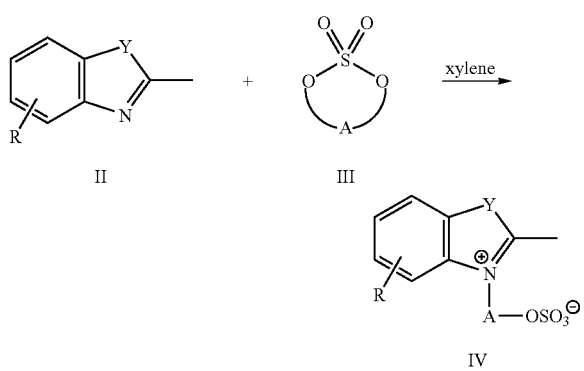

in which A is $-(CH_2)_n-$, in which n=1–5, and R and Y are as defined above.

In the second step, the inner salt of structure IV is condensed with a bisaldehyde of structure V in an organic solvent, such as dimethylformamide, at room or an elevated temperature, to produce the N-alkyl sulfate cyanine compound.

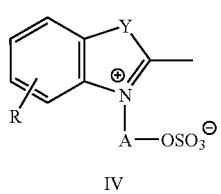

IV

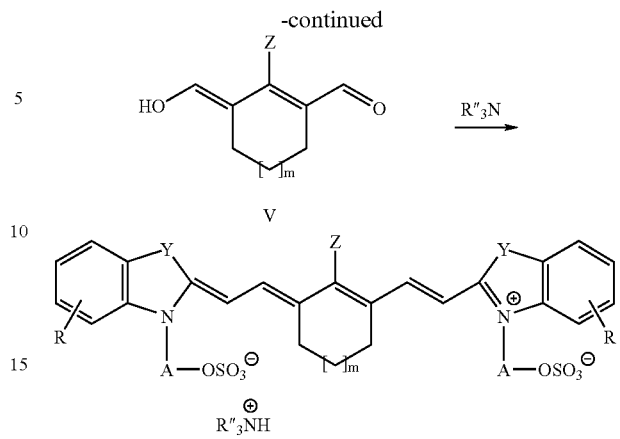

An amine ($R''_3N$ in which each R'' is typically independently hydrogen or an alkyl group), such as triethyl amine, is present in the reaction mixture. It forms a cation that compensates for the negative charge of one of the sulfate groups. Ammonia and/or other amines such as methyl amine, dimethyl amine, trimethyl amine, ethyl amine, diethylamine, n-propyl amine, n-butyl amine, n-hexyl amine, n-octyl amine, ethanol amine, diethanol amine, and triethanol amine may be used in place of or in addition to triethyl amine. The resulting dye may be used to prepare the infrared absorbing compound using the method described below.

Dyes that have infrared absorbing oxonol anions are disclosed, for example, in Williams, U.S. Pat. Nos. 6,248, 893 and 6,538,140; DoMinh, U.S. Pat. No. 6,423,469; Nishigaki, U.S. Pat. No. 6,159,673; and Morishima, U.S. Pat. No. 6,646,132, the disclosures of which are incorporated herein by reference. DoMinh, for example, discloses infrared absorbing oxonol dyes of the following structures:

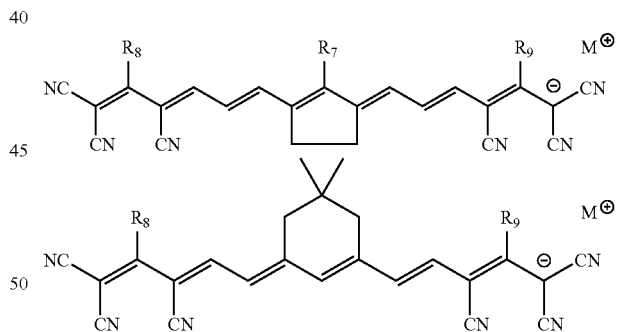

in which $R_7$ is a secondary or tertiary amine, $M^\oplus$ is a monovalent cation, and $R_8$ and $R_9$ are independently heterocyclic or carbocyclic aromatic groups.

Preparation of the Infrared Absorbing Compounds

The infrared absorbing compounds may be prepared by free radical polymerization. In a typical preparation, a mixture of three monomers, one that is the precursor of the K unit, one that is the precursor of the L unit, and one that is the precursor of the M unit are co-polymerized.

Free radical polymerization is well known to those skilled in the art and is described, for example, in Chapters 20 and 21, of *Macromolecules*, Vol. 2, 2nd Ed., H. G. Elias, Plenum, New York, 1984. Useful free radical initiators are peroxides such as benzoyl peroxide, hydroperoxides such as cumyl hydroperoxide and azo compounds such as 2,2'-azobis (isobutyronitrile) (AIBN). Chain transfer agents, such as dodecyl mercaptan, may be used to control the molecular weight of the compound. Suitable solvents for free radical polymerization include liquids that are inert to the reactants and which will not otherwise adversely affect the reaction, for example, esters such as ethyl acetate and butyl acetate; ketones such as methyl ethyl ketone, methyl isobutyl ketone, methyl propyl ketone, and acetone; alcohols such as methanol, ethanol, isopropyl alcohol, and butanol; ethers such as dioxane and tetrahydrofuran, and mixtures thereof. However, the infrared absorbing compounds are preferably prepared in hydrophilic media (water or mixtures of water and alcohol), which form core-shell particles that disperse in solvent. The particle size of the core-shell particles is from 10 nm to 10 microns, preferably 50 nm to 1 micron.

Precursors of the K unit include, for example, styrene, 3-methyl styrene, 4-methyl styrene, 4-methoxy styrene, 4-acetoxy styrene, alpha-methyl styrene, acrylic acid, methyl acrylate, ethyl acrylate, butyl acrylate, n-hexyl acrylate, methacrylic acid, methyl methacrylate, ethyl methacrylate, n-propyl methacrylate, n-butyl methacrylate, n-pentyl methacrylate, neo-pentyl methacrylate, cyclohexyl methacrylate, n-hexyl methacrylate, 2-ethoxyethyl methacrylate, allyl methacrylate, 2-(methylsulfonyl)ethyl methacrylate, methyl cyanoacrylate, ethyl cyanoacrylate, vinyl acetate, vinyl butyrate, methyl vinyl ketone, butyl vinyl ketone, acrylonitrile, methacrylonitrile, acrylamide, N,N-dimethyl acrylamide, N-vinyl acetamide, N-vinyl formamide, vinyl fluoride, vinyl chloride, vinyl bromide, vinyl trimethyl silane, vinyl trimethoxysilane, maleic anhydride, maleimide, N-phenyl maleimide, N-cyclohexyl maleimide, N-benzyl maleimide, N-hydroxy maleimide, itaconic anhydride, 2-methylene-glutaric anhydride, 3-methylene-glutaric anhydride, N-vinyl caprolactam, and mixtures thereof. Preferred precursors for the K unit include styrene, methyl methacrylate, and acrylonitrile.

Precursors of the L unit include, for example, polyethylene glycol monomethacrylate, polypropylene glycol methyl ether methacrylate, polyethylene glycol ethyl ether methacrylate, polyethylene glycol butyl ether methacrylate, polypropylene glycol hexyl ether methacrylate, polypropylene glycol octyl ether methacrylate, polyethylene glycol methyl ether acrylate, polyethylene glycol ethyl ether acrylate, polyethylene glycol phenyl ether acrylate, polypropylene glycol monoacrylate, polypropylene glycol monomethacrylate, polypropylene glycol methyl ether methacrylate, polypropylene glycol ethyl ether methacrylate, polypropylene glycol butyl ether methacrylate, poly (ethylene glycol/propylene glycol)methyl ether methacrylate, poly(vinyl alcohol)monomethacrylate, poly(vinyl alcohol)monoacrylate, and mixtures thereof. Preferred precursors for the L unit include poly(ethylene glycol) methyl ether methacrylate, poly(ethylene glycol)acrylate, and poly (propylene glycol) methyl ether methacrylate.

Precursors of the M unit include, for example, 2-[(acryloyloxy)ethyl]-trimethylammonium chloride, 2-[(acryloyloxy)ethyl]-trimethylammonium methyl sulfate, 2-[(acryloyloxy)propyl]-trimethylphosphonuim chloride, 2-[(methacryloyloxy)ethyl]-trimethylammonium chloride, 2-[(methacryloylamino)ethyl]-trimethylammonium chloride, 2-(methacryloyloxy)ethyl]-trimethylammonium methyl sulfate, 2-[(methacryloyloxy)ethyl]-phenyliodonium iodide, 3-[(methacryloyloxy)propyl]-trimethylammonium chloride, 3-[(methacryloylamino)propyl]-trimethylammonium chloride, 3-[(methacryloyloxy)propyl]-dimethylsulfonium chloride, 3-[(methacryloyloxy)propyl]-methyliodonium iodide, 3-[(methacryloyloxy)propyl]-trimethylphosphonium chloride, 4-[(methacryloyloxy) butyl]-trimethylammonium chloride, 4-[(methacryloylamino)butyl]-trimethylammonium chloride, 4-[(acryloyloxy)butyl]-trimethylammonium chloride, 4-[(acryloylamino)butyl]-trimethylammonium chloride, 5-[(methacryloyloxy)pentyl]-trimethylammonium chloride, 5-[(methacryloylamino)pentyl]-trimethylammonium chloride, 3-(ethenyl)phenyl-trimethylammonium chloride, 4-(ethenyl)phenyl-trimethylammonium chloride, 4-(ethenyl)phenyl-trimethylphosphonium chloride, vinyl trimethylphosphonium chloride, and mixtures thereof. Preferred precursors for the M unit include 2-[(methacryloylamino)-ethyl]-trimethylammonium, and 3-[(methacryloyloxy)-propyl]-trimethylammonium.

The co-polymerization may be carried out in the presence of one or more compounds that have an infrared absorbing cyanine anion that has two to four sulfonate groups, sulfate groups, or mixtures thereof and/or an infrared absorbing oxonol anion. When water or a mixture of water and alcohol is used as the solvent, the infrared absorbing compound precipitates out and is filtered from the reaction mixture. Alternatively, a co-polymer that does not contain infrared absorbing anions may be prepared and the infrared absorbing anion introduced in a separate step. Other methods for preparing the infrared absorbing compounds, such as by methods in which the onium group is formed after formation of the polymer, will be apparent to those skilled in the art.

Imageable Element

Substrate

The imageable element comprises an imageable layer over a substrate. The substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent coated layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a printing form, typically from about 100 μm to about 600 μm. Typically, the substrate comprises an interlayer between the aluminum support and the imageable layer. The interlayer may be formed by treatment of the support with, for example, silicate, dextrine, hexafluorosilicic acid, phosphate/fluoride, polyvinyl phosphonic acid (PVPA) or vinyl phosphonic acid co-polymers.

The back side of the substrate (i.e., the side opposite the imageable layer) may be coated with an antistatic agent and/or a slipping layer or matte layer to improve handling and "feel" of the imageable element.

Imageable Layer

In one aspect, the infrared absorbing compound or the mixture thereof, is the only essential component of the imageable layer. The infrared absorbing compound or mixture thereof typically comprises at least about 80 wt %, more typically at least 90%, of the imageable layer. Also present, for example, may be one or more alkali soluble or dispersible non-infrared absorbing compounds, such as a compound or compounds equivalent to infrared absorbing compound or compound present in the imageable layer except that $D^\ominus$ is a non-infrared absorbing anion or mixture of non-absorbing anions. A surfactant, such as a fluorinated surfactant or a polyethoxylated dimethylpolysiloxane co-polymer, or a mixture of surfactants may be present to help disperse the infrared absorbing compound in a coating solvent.

In another aspect, the imageable layer may comprise one of more co-binders in addition to the infrared absorbing compound. The co-binder may be a water-soluble or water-dispersible polymer, such as, a cellulose derivative such as carboxymethyl cellulose, methyl cellulose, hydroxy propyl methyl cellulose, hydroxy propyl cellulose, hydroxy ethyl cellulose; polyvinyl alcohol; polyacrylic acid; polymethacrylic acid; polyvinyl pyrrolidone; polylactide; polyvinyl phosphonic acid; a synthetic co-polymer, such as a co-polymer of an alkoxy polyethylene glycol acrylate or methacrylate, for example methoxy polyethylene glycol acrylate or methacrylate, with a monomer such as methyl methacrylate, methyl acrylate, butyl methacrylate, butyl acrylate, or allyl methacrylate; or a mixture thereof.

In another aspect of the invention, the infrared absorbing compound is used both as a binder and an infrared absorber in an infrared sensitive free radical polymerizable composition. Negative working free radical polymerizable compositions comprise a monomer, an initiator system, and, optionally a binder. These compositions are well known to those skilled in the art and are described, for example, in *Photoreactive Polymers: The Science and Technology of Resists*, A. Reiser, Wiley, New York, 1989, pp. 102–177; in "Photopolymers: Radiation Curable Imaging Systems," by B. M. Monroe, in *Radiation Curing: Science and Technology*, S. P. Pappas, Ed., Plenum, New York, 1992, pp. 399–440; and "Polymer Imaging" by A. B. Cohen and P. Walker, in *Imaging Processes and Material*, J. M. Sturge, et al., Eds, Van Nostrand Reinhold, New York, 1989, pp. 226–262.

Free radical polymerizable compositions comprise a free radical generator, that is a compound that generates free radicals when the imageable element is thermally imaged. Thermally sensitive free radical generators include, for example, peroxides such as benzoyl peroxide; hydroperoxides such as cumyl hydroperoxide; azo compounds such as AIBN; 2,4,5-triarylimidazolyl dimers (HABIs) such as are disclosed in Dueber, U.S. Pat. No. 4,565,769; onium salts, for example, diazonium salts, iodonium salts, sulfonium salts, phosphonium salts, and pyridinium salts; and mixtures thereof. The use of sulfonium salts to initiate free radical polymerization is disclosed, for example, in E. Takahashi, et al., *J. Appl. Poly. Sci.*, 91, 589–597 (2004), and E. Takahashi, et al., *J. Poly. Sci.*, Part A: Polymer Chemistry, 41, 3816–3827 (2003). Diaryliodonium salts and triarylsulfonium salts are preferred onium salts.

Free radical polymerizable compositions comprise at least one ethylenically unsaturated compound that undergoes free-radical initiated polymerization, generally known as a monomer. The monomers are typically multifunctional, i.e., they comprise more than one ethylenically unsaturated, free radical polymerizable group. Typical multifunctional monomers are unsaturated esters of alcohols, preferably acrylate and methacrylate esters of polyols. Oligomers and/or prepolymers, such as urethane acrylates and methacrylates, epoxide acrylates and methacrylates, polyester acrylates and methacrylates, polyether acrylates and methacrylates and unsaturated polyester resins, may also be used. Numerous other unsaturated monomers polymerizable by free-radical initiated polymerization and useful in polymerizable compositions are known to those skilled in the art.

In addition, the imageable layer may comprise one more co-binders, such as are described above. Other conventional ingredients, such as surfactants and contrast dyes, may also be present.

The free radical polymerizable composition typically comprises about 40 wt % to about 90 wt %, preferably about 50 wt % to about 85 wt %, of the infrared absorbing compound; 0 wt % to about 50 wt %, preferably about 1 wt % to about 30 wt %, of the co-binder; about 0.01 wt % to about 20 wt %, preferably about 0.1 wt % to about 10 wt %, of the free radical generator; about 0.1 wt % to about 50 wt %, preferably about 1 wt % to about 30 wt %, of the monomer; and about 0 wt % to about 20 wt %, preferably about 0 wt % to about 5 wt %, of the other ingredients.

Preparation of the Imageable Element

The imageable element may be prepared by applying the imageable layer over the hydrophilic surface of the substrate using conventional techniques. The imageable layer may be applied by any conventional method, such as coating or lamination. Typically the ingredients of the imageable layer are dispersed or dissolved in a suitable coating solvent, such as water or a mixture of water and an organic solvent such as methanol, ethanol, 1-propanol, 2-propanol, and/or acetone, and the resulting mixture coated by conventional methods, such as spin coating, bar coating, gravure coating, die coating, slot coating, or roller coating. After coating, the layer is dried to remove the coating solvent. The resulting element may be air dried at ambient temperature or at an elevated temperature, such as at about 65° C. for about 20 seconds in an oven. Alternatively, the resulting imageable element may be dried by blowing warm air over the element. The coating weight for the imageable layer is typically about 0.5 g/m² to about 2.5 g/m², preferably about 1 g/m² to about 1.5 g/m².

Imaging and Processing

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618-400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged regions and complementary unimaged regions. After imaging, the unimaged regions are removed more rapidly by the developer than the imaged regions i.e., the element is negative working. Development of the imaged element to form a printing plate, or printing form, converts the latent image to an image by removing the unimaged regions, revealing the hydrophilic surface of the underlying substrate.

The developer is an aqueous liquid, such as water or a fountain solution. The imaged imageable element may be developed in water. Although distilled or deionized water may be used, the imaged element typically can be developed in tap water. Although development with tap water will typically be carried out in a separate processor, rather than on press, it is not necessary to prepare and dispose of expensive, high pH developers when water is used. In addition, only a simple processor is necessary so expensive processors are not required to develop the imaged imageable element in water.

Alternatively, the imaged imageable element can be directly mounted on press after imaging and developed with fountain solution during the initial prints. No separate development step is needed before mounting on press. This eliminates the separate development step along with both the processor and developer, thus simplifying the printing process and reducing the amount of expensive equipment required. The imaged imageable element is mounted on the plate cylinder of a lithographic press and developed with fountain solution by rotating the press cylinders and contacting the element with fountain solution.

Numerous aqueous fountain solutions are known to those skilled in the art. Fountain solutions are disclosed, for example, in Matsumoto, U.S. Pat. No. 5,720,800; Archer, U.S. Pat. No. 5,523,194; Chase, U.S. Pat. No. 5,279,648; Bondurant, U.S. Pat. Nos. 5,268,025, 5,336,302, and 5,382,298; Egberg, U.S. Pat. No. 4,865,646; and Daugherty, U.S. Pat. No. 4,604,952. Typical ingredients of aqueous fountain solutions, in addition to water, typically deionized water, include pH buffering systems, such as phosphate and citrate buffers; desensitizing agents, such as dextrin, gum arabic, and sodium carboxymethylcellulose; surfactants and wetting agents, such as aryl and alkyl sulfonates, polyethylene oxides, polypropylene oxides, and polyethylene oxide derivatives of alcohols and phenols; humectants, such as glycerin and sorbitol; low boiling solvents such as ethanol and 2-propanol; sequestrants, such as borax, sodium hexametaphosphate, and salts of ethylenediamine tetraacetic acid; biocides, such as isothiazolinone derivatives; and antifoaming agents.

In conventional wet press lithographic printing, fountain solution and then ink are applied to the printing plate. For presses with integrated inking/dampening system, the ink and fountain solution are emulsified by various press rollers before being transferred to the plate as emulsion of ink and fountain solution. However, in this invention, the ink and fountain solution may be applied in any combination or sequence, as needed for the printing plate.

For on-press imaging, the imageable element is imaged while mounted on a lithographic printing press cylinder, and the imaged imageable element is developed on press with fountain solution during the initial press operation. This is especially suitable for computer-to-press application in which the imageable element (or elements, for multiple color presses) is directly imaged on the plate cylinder according to computer generated digital imaging information and, with minimum or no treatment, directly prints out regular printed sheets. On-press imaging may be carried out on, for example, a Quickmaster DI 46-4 press (Heidelberger Druckmaschinen, Heidelberg, Germany).

INDUSTRIAL APPLICABILITY

The imageable elements of the invention can be used in photomask lithography, imprint lithography, microelectronic and microoptical devices, printed circuit boards, and especially as radiation sensitive lithographic plate precursors. When the imageable element is used as a lithographic printing plate precursor, it can be developed with water or on-press using fountain solution as the developer thus avoiding the costs associated with the use of alkaline developers. Once the imageable element has been imaged and developed to form a lithographic printing plate, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

In the Examples, "coating solution" refers to the mixture of solvent or solvents and additives coated, even though some of the additives may be in suspension rather than in solution. Except where indicated, the indicated percentages are percentages by weight.

GLOSSARY

| | |
|---|---|
| AIBN | 2,2'-Azobisisobutyronitrile (Aldrich, Milwaukee, WI USA) |
| BYK 336 | Modified dimethyl polysiloxane co-polymer in a 25% xylene/methoxypropyl acetate solution (Byk Chemie (Wallingford, CT USA) |
| Co-polymer 1 | Methoxy polyethylene glycol methacrylate-allyl methacrylate co-polymer |
| CREO ® Trendsetter 3244 | Commercially available platesetter, using Procom Plus software, operating at a wavelength of 830 nm (Creo Products, Burnaby, BC, Canada) |
| DESMODUR ® N 100 | Solvent-free, aliphatic polyisocyanate polymer based on hexamethylene diisocyanate (Bayer, Milford, CT, USA) |
| DMF | Dimethylformamide |
| IR Dye A | Infrared absorbing compound, see structure below (Eastman Kodak, Rochester, NY USA) |
| IR Dye B | 2-[2-[2-chloro-3-[[1,3-dihydro-3,3-dimethyl-1-(3-sulfaethyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1) (see structure below) |
| IRGACURE ® 250 | Cationic iodonium photoinitiator (Ciba Specialty Chemicals, Tarrytown, NY USA) |
| KLUCEL ® M | 2% Hydroxypropyl cellulose in water (Hercules, Heverlee, Belgium) |
| LODYNE ® 103A | Fluorosurfactant, (Ciba Specialty Chemicals, Tarrytown, NY, USA) |
| Mercapto-3-traizole | Mercapto-3-triazole-1H, 2, 4 (PCAS, Paris, France) |
| Substrate A | 0.3 mm thick aluminum sheet which had been electrograined, anodized and post-treated with a solution of polyvinylphosphonic acid (PVPA) |
| Urethane Acrylate | 80% 2-butanone solution of a urethane acrylate obtained by reaction of DESMODUR ® N100 and hydroxyethyl acrylate and pentaerythrol triacrylate |

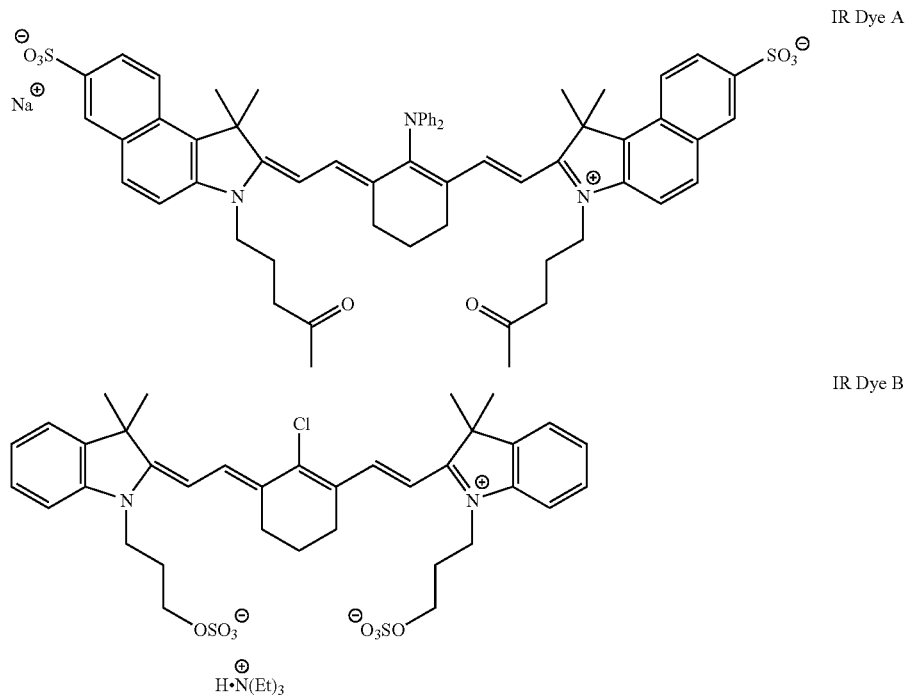

IR Dye A

IR Dye B

Example 1

This Example illustrates the synthesis of an infrared absorbing compound that contains the infrared absorbing anion of IR Dye A. 5.0 g of poly(ethyleneglycol) methyl ether methacrylate (50 wt % in water, MW=2,000, Aldrich), 3.0 g of 3-[(methacryloyloxy)propyl]-trimethylammonium chloride (50 wt % in water, Aldrich), 0.70 g of IR Dye A, and 20.3 g of styrene were placed in a mixture of water (12 g) and 1-propanol (64 g) in a 250-ml 3-necked flask, equipped with condenser, mechanic stirring, temperature controller and nitrogen inlet. The mixture was heated to 80° C. under nitrogen for 0.5 hr. A solution containing 0.16 g of AIBN in 2.0 g of styrene was added in a small portion to the 3-necked flask over 1 hr. The reaction mixture was stirred at 80° C. under nitrogen for an additional 3 hr. After the reaction mixture cooled to room temperature, 108 g of a blue dispersion of the infrared absorbing compound was obtained with a non-volatile composition of 23.3%. The infrared absorbing compound had an average particle size of 163 nm.

Example 2

This example describes the synthesis of an infrared absorbing compound that contains the infrared absorbing anion of IR Dye B. The procedure of Example 1 was repeated except that 0.70 g of IR Dye B was used in place of IR Dye A. After the reaction mixture had cooled to room temperature, 105 g of a green dispersion of the infrared absorbing compound was obtained with a non-volatile composition of 20.5%. The particle size of the infrared absorbing compound had a bimodal distribution with 81% of the particles at 270 nm and 19% of the particles at 107 nm.

Example 3

This example describes the synthesis of a co-polymer that does not have an infrared-absorbing compound attached. The procedure of Example 1 was repeated except that the IR dye was omitted. After the reaction mixture had cooled to room temperature, 104 g of white, milk-like dispersion of co-polymer was obtained with a non-volatile composition of 24.4%. The co-polymer had an average particle size of 150 nm.

Example 4

This example describes preparation and imaging of an imageable element of the invention. A coating solution was prepared by combining 26.2 g of the infrared absorbing compound from Example 1, 0.2 g of 10% LODYNE 103A, 8.4 g of 1-propanol and 65 g of water. Substrate A was mounted on a hot rotating drum and contacted with the coating solution, which was delivered to the substrate by a pump. The coated substrate was dried by blowing hot air at about 66° C. (150° F.) for about 2 minutes over the substrate to yield the imageable element (printing plate precursor) comprising the imageable layer over the substrate. Dry coating weight of the imageable layer: about 1.38 g/m².

The precursor was placed on the CREO® Trendsetter 3244x and imaged with 830 nm radiation at a power of 12 W and a range of drum speeds from 210 to 50 rpm, corresponding to exposure energies of 130 to 540 mJ/cm². The imaged precursor was developed in tap water to remove unexposed regions of the imageable layer. The resolution of the resulting image was at least 5 to 95% at 175 lines per inch. The minimum exposure energy to achieve a good image was about 200 mJ/cm².

A second precursor was imaged at 350 mJ/cm² and then mounted directly on an A.B. Dick 9870 Duplicator Press (A.B. Dick, Niles, Ill., USA). The press was charged Van Son Rubber Base black Ink (Van Son Ink, Mineola, N.Y., USA). The aqueous fountain solution contained about 23.5 ml/L (3 oz per gallon) Varn Litho Etch142W (Varn International, Addison, Ill., USA), and about 23.5 ml/L (3 oz per gallon) Varn PAR (alcohol substitute) in water. The imaged precursor was developed in fountain solution to yield a printable lithographic printing plate, which printed at least 250 copies of good prints.

Example 5

This example describes preparation and imaging of an imageable element of the invention. The imageable element (printing plate precursor) was prepared as in Example 4 except that the coating solution was prepared by combining 26.2 g of infrared absorbing compound from Example 2, 0.2 g of 10% LODYNE 103A, 8.4 g of n-propanol and 65 g of water. Dry coating weight of the imageable layer: about 1.38 g/m².

The precursor was imaged and developed as described in Example 4. The resolution of the resulting image was at least 5 to 95% at 175 lines per inch. The minimum exposure energy to achieve a good image was about 250 mJ/cm².

A second precursor was imaged at 350 mJ/cm² and then mounted directly on the A.B. Dick Press and developed with fountain solution as in Example 4. The resulting plate printed at least 250 copies of good prints.

Example 6

This example describes preparation and imaging of an imageable element that does not contains an infrared absorbing compound that is not an infrared absorbing compound of the invention. An imageable element (printing plate precursor) was prepared as in Example 4 except that the coating solution was prepared by combining 24.6 g of the polymer from Example 3, 0.41 g of IR Dye A, 0.2 g of 10% LODYNE 103A, 9.6 g of n-propanol and 65 g of water. Dry coating weight of the imageable layer: about 1.38 g/m².

The precursor was imaged and developed as described in Example 4. The resolution of the resulting image appeared to be at least 5 to 95% at 175 lines per inch, and the minimum exposure energy to achieve a good image was about 200 mJ/cm².

A second precursor was imaged at 350 mJ/cm² and then mounted directly on the A.B. Dick Press and developed with fountain solution as in Example 4. The resulting printing plate showed background scrumming for at least 250 impressions.

Example 7

This example illustrates an imageable element of the invention in which the imageable layer comprises a polymerizable composition. The coating solution in Table 1 was coated onto Substrate A using a wire-wound rod and then dried for about 60 seconds in a Ranar conveyor oven set at 94° C. Dry coating weight of the imageable layer: 1.5 g/m².

TABLE 1

| Component | Parts by Weight (%) |
| --- | --- |
| Urethane Acrylate | 2.43 |
| Polymer from Example 1 | 13.71 |
| Co-polymer 1 | 3.97 |
| IRGACURE ® 250 | 0.42 |
| Mercapto-3-triazole[4] | 0.18 |
| KLUCEL ® M | 3.31 |
| BYK 336 | 0.60 |
| n-Propanol | 61.97 |
| Water | 13.41 |

The resulting imageable elements were imaged on the CREO® Trendsetter at 300 mJ/cm². The resulting imaged lithographic printing plate precursor was mounted directly on the AB Dick 9870 duplicator press (A.B. Dick, Niles, Ill., USA) and developed with fountain solution as in Example 4. The plates each printed 250 copies of good quality prints.

Example 8

This example illustrates the preparation of IR Dye B.

a. Preparation 2-chloro-1-formyl-3-hydroxymethylenecyclohexene (Intermediate A)

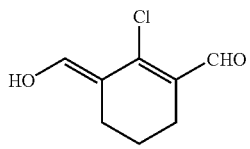

80 ml of DMF was placed in a 500 ml round bottom flask equipped with a magnetic stirrer, a nitrogen gas inlet, a condenser, a thermometer and a pressure-equalizing additional funnel. The flask was cooled in an ice-water bath and 74 ml of phosphorous oxychloride was slowly added to the DMF while the reaction temperature was maintained between 10 and 15° C. for 1 hour. Upon the completion of the addition, the reaction mixture was allowed to warm to room temperature for 30 minutes. A mixture of 20 g of cyclohexanone and 100 ml of DMF was slowly added to the flask the reaction temperature was maintained between 40 and 50° C. The mixture was heated at 55° C. for 3 hours in a water bath, and was then slowly poured into a mixture of 600 g of ice and 400 g of water. After the reaction mixture was stirred for about 15 hours, the precipitate was filtered and washed with water until a neutral filtrate was obtained. The resulting yellow solid was collected and dried at ambient temperature in dark overnight. Yield; 26 g.

b. Preparation of 2,3,3-trimethyl-(3-sulfaethyl)indolenium, inner salt (Intermediate B)

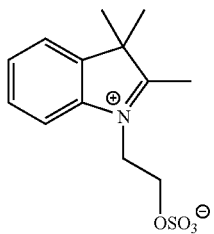

4.0 g of 2,3,3-trimethylindolenine (TCI America) was mixed with 3.1 g of 1,3,2-dioxathiolane-2,2-dioxide (Aldrich) in 50-ml of toluene in a 100-ml flask equipped with condenser and stirring bar. The mixture was heated at 100° C. in an oil bath for 14 hours. After the reaction mixture was cooled to room temperature, the toluene was decanted, and the orange solid residual was stirred with 100-ml of acetone for 3 h. The suspension was filtered and washed with 3×50 ml of acetone. The product was dried in ambient temperature. Yield: 3.8 g. Proton NMR (in DMSO-$d_6$): δ 1.53 (6H, s), 2.82 (3H, s), 4.21 (2H, t), 4.71 (2H, t) and 7.50–8.05 (4H, m).

c. Preparation IR Dye B 0.3 g of triethylamine and 0.2 g of acetic anhydride were dissolved in 5 g of DMF. 0.55 g of Intermediate B and 0.18 g of intermediate A were added to the DMF solution. The mixture was stirred at room temperature for 1 h and the color turned into dark green. Another portion of 0.3 g of triethylamine and 0.2 g of acetic anhydride was added and the reaction mixture was stirred overnight. After the reaction mixture was cooled to 0–5° C. in a water-ice bath, the resulting precipitate was filtered off, washed with 30 ml of ethyl acetate, and dried in a vacuum. Yield: 0.36 g. Proton NMR (in DMSO-$d_6$): δ 1.15 (9H, t), 1.68 (12H, s), 1.82 (2H, m), 2.74 (4H, m), 3.05 (6H, m), 4.10 (4H, t), 4.44 (4H, t), 6.52 (2H, d), 7.2–7.8 (8H, m), 8.25) and 8.80 (1H, br).

Having described the invention, we now claim the following and their equivalents.

What is claimed is:

1. An infrared absorbing compound, the compound comprising x wt % K units, y wt % L units, and z wt % of M units, in which:
   (i) K is selected from —[$CH_2C(R^1)R^2$]—, —[$CH_2CR^1(CO_2R^3)$]—, —[$CH_2CR^1(CONR^3{}_2)$]—, —[—CH(COECO)CH—]—, and mixtures thereof;
   (ii) L is —[$CH_2C(R^4)CO_2B_nT$]-; and
   (iii) M is —[$CH_2C(R^4)(-Q-G^\oplus)(D^\ominus)$]- or —[$CH_2C(R^4)(G^\oplus)(D^\ominus)$]-;
in which:

$x+y+z$=about 100 wt %;

each $R^1$ is independently hydrogen, alkyl of one to six carbon atoms, phenyl, substituted phenyl, or cyano; each $R^2$ is independently hydrogen, alkyl of one to six carbon atoms, phenyl, substituted phenyl, halogen, cyano, alkoxy of one to four carbon atoms, acyl of one to five carbon atoms, acyloxy of one to five carbon atoms, allyl, —$CH_2CH_2OCH_2CH_3$, —$CH_2CH_2SO_2CH_3$, —NHC(O)H, —NHC(O)$CH_3$, —Si($CH_3$)$_3$, —Si(O$CH_3$)$_3$, or a cyclic —[$NC(O)CH_2CH_2CH_2$] group; or $R^1$ and $R^2$ together are —$CH_2C(O)OC(O)$—, —($CH_2$)$_2C(O)OC(O)$—, or —$CH_2C(O)OC(O)CH_2$—; each $R^3$ is independently hydrogen, alkyl of one to six carbon atoms, or phenyl; each $R^4$ is independently hydrogen, alkyl of one to six carbon atoms, phenyl, substituted phenyl, or cyano;

E is oxygen or $NR^6$ in which each $R^6$ is hydrogen, hydroxyl, phenyl, substituted phenyl, alkyl of one to six carbon atoms, or benzyl;

B is selected from —$CH_2$—CH($R^5$)—O— and —$CH_2$—C($R^5$)(OH)—, in which each $R^5$ is independently hydrogen or alkyl of one to six carbon atoms;

n is about 5 to about 400;

T is hydrogen, alkyl of one to eight carbon atoms, or phenyl;

Q is —$CO_2(CH_2)_m$—, —CONH($CH_2$)$_m$—, —($CH_2$)$_m$—, —$CO_2C_6H_4$—, or —$C_6H_4$—, in which m is 1 to 5;

$G^\oplus$ is selected from ammonium, sulfonium, phosphonium, and iodonium; and $D^\ominus$ is selected from the group consisting of infrared absorbing cyanine anions that have a total of two to four groups selected from sulfonate groups, sulfate groups, and mixtures thereof; infrared absorbing oxonol anions; and mixtures thereof.

2. The infrared absorbing compound of claim 1 in which
$R^1$ is hydrogen or methyl;
$R^2$ is phenyl or cyano;
$R^3$ is methyl,
$R^4$ is hydrogen or methyl;
$R^5$ is hydrogen, methyl, or a mixture thereof;

T is hydrogen, methyl, ethyl, or n-butyl; and n is about 10 to about 100.

3. The infrared absorbing compound of claim 2 in which x is about 30 wt % to about 98 wt %; y is about 1 wt % to about 50 wt %; and z is about 1 wt % to about 50 wt %.

4. The infrared absorbing compound of claim 3 in which: B is $-CH_2-CH(R^5)-O-$; Q is $-CO_2(CH_2)_m-$; and m is two to five.

5. The infrared absorbing compound of claim 4 in which $G^\oplus$ is ammonium.

6. The infrared absorbing compound of claim 5 in which $D^\ominus$ is an infrared absorbing cyanine anion or mixture infrared absorbing cyanine anions.

7. The infrared absorbing compound of claim 5 in which $D^\ominus$ is an infrared absorbing oxonol anion or mixture infrared absorbing oxonol anions.

8. The infrared absorbing compound of claim 5 in which x is about 60 wt % to about 98 wt %; y is about 2 wt % to about 30 wt %; and z is about 2 wt % to about 30 wt %.

9. The infrared absorbing compound of claim 8 in which $G^\oplus$ is trimethyl ammonium.

10. The infrared absorbing compound of claim 1 in which:
    $G^\oplus$ is ammonium;
    B is $-CH_2-CH(R^5)-O-$;
    $R^1$ is hydrogen or methyl;
    $R^2$ is phenyl or cyano;
    $R^3$ is methyl,
    $R^4$ is hydrogen or methyl;
    $R^5$ is hydrogen, methyl, or a mixture thereof;
    Q is $-CO_2(CH_2)_m-$; and
    m is two to five.

11. An imageable element comprising an imageable layer over a substrate, in which the imageable layer comprises an infrared absorbing compound comprising x wt % K units, y wt % L units, and z wt % of M units, in which:
    (i) K is selected from $-[CH_2C(R^1)R^2]-$, $-[CH_2CR^1(CO_2R^3)]-$, $-[CH_2CR^1(CONR^3_2)]-$, $-[-CH(CO-ECO)CH-]-$, and mixtures thereof;
    (ii) L is $-[CH_2C(R^4)CO_2B_nT]-$; and
    (iii) M is $-[CH_2C(R^4)(-Q-G^\oplus)(D^\ominus)]-$ or $-[CH_2C(R^4)(G^\oplus)(D^\ominus)]-$;

in which:

$x+y+z=$about 100 wt %;

each $R^1$ is independently hydrogen, alkyl of one to six carbon atoms, phenyl, substituted phenyl, or cyano; each $R^2$ is independently hydrogen, alkyl of one to six carbon atoms, phenyl, substituted phenyl, halogen, cyano, alkoxy of one to four carbon atoms, acyl of one to five carbon atoms, acyloxy of one to five carbon atoms, allyl, $-CH_2CH_2OCH_2CH_3$, $-CH_2CH_2SO2CH_3$, $-NHC(O)H$, $-NHC(O)CH_3$, $-Si(CH_3)_3$, $-Si(OCH_3)_3$, or a cyclic $-[NC(O)CH_2CH_2CH_2]$ group; or $R^1$ and $R^2$ together are $-CH_2C(O)OC(O)-$, $-(CH_2)_2C(O)OC(O)-$, or $-CH_2C(O)OC(O)CH_2-$; each $R^3$ is independently hydrogen, alkyl of one to six carbon atoms, or phenyl; each $R^4$ is independently hydrogen, alkyl of one to six carbon atoms, phenyl, substituted phenyl, or cyano;

E is oxygen or $NR^6$ in which each $R^6$ is hydrogen, hydroxyl, phenyl, substituted phenyl, alkyl of one to six carbon atoms, or benzyl;

B is selected from $-CH_2-CH(R^5)-O-$ and $-CH_2-C(R^5)(OH)-$, in which each $R^5$ is independently hydrogen or alkyl of one to six carbon atoms;

n is about 5 to about 400;

T is hydrogen, alkyl of one to eight carbon atoms, or phenyl;

Q is $-CO_2(CH_2)_m-$, $-CONH(CH_2)_m-$, $-(CH_2)_m-$, $-CO_2C_6H_4-$, or $-C_6H_4-$, in which m is 1 to 5;

$G^\oplus$ is selected from ammonium, sulfonium, phosphonium, and iodonium; and $D^\ominus$ is selected from the group consisting of infrared absorbing cyanine anions that have a total of two to four groups selected from sulfonate groups, sulfate groups, and mixtures thereof; infrared absorbing oxonol anions; and mixtures thereof.

12. The imageable element of claim 11 in which:
    $R^1$ is hydrogen or methyl;
    $R^2$ is phenyl or cyano;
    $R^3$ is methyl,
    $R^4$ is hydrogen or methyl;
    $R^5$ is hydrogen, methyl, or a mixture thereof;
    T is hydrogen, methyl, ethyl, or n-butyl; and
    n is about 10 to about 100.

13. The imageable element of claim 12 in which x is about 30 wt % to about 98 wt %; y is about 1 wt % to about 50 wt %; and z is about 1 wt % to about 50 wt %.

14. The imageable element of claim 13 in which:
    $G^\oplus$ is ammonium; B is $-CH_2-CH(R^5)-O-$; and Q is $-CO_2(CH_2)_m-$.

15. The imageable element of claim 14 in which the imageable layer consists essentially of the infrared absorbing compound.

16. The imageable element of claim 14 in which the imageable layer additionally comprises a co-binder, a monomer, and a thermally sensitive free radical generator.

17. A method for forming an image, the method comprising the steps of:
    (a) thermally imaging an imageable element comprising an imageable layer over a substrate and forming an imaged imageable element comprising imaged and complementary unimaged regions in the imageable layer; and
    (b) developing the imaged imageable element in an aqueous developer and removing the unimaged regions;

in which the imageable layer comprises an infrared absorbing compound comprising x wt % K units, y wt % L units, and z wt % of M units, in which:
    (i) K is selected from $-[CH_2C(R^1)R^2]-$, $-[CH_2CR^1(CO_2R^3)]-$, $-[CH_2CR^1(CONR^3_2)]-$, $-[-CH(CO-ECO)CH-]-$, and mixtures thereof;
    (ii) L is $-[CH_2C(R^4)CO_2B_nT]-$; and
    (iii) M is $-[CH_2C(R^4)(-Q-G^\oplus)(D^\ominus)]-$ or $-[CH_2C(R^4)(G^\oplus)(D^\ominus)]-$;

in which:

$x+y+z=$about 100 wt %;

each $R^1$ is independently hydrogen, alkyl of one to six carbon atoms, phenyl, substituted phenyl, or cyano; each $R^2$ is independently hydrogen, alkyl of one to six carbon atoms, phenyl, substituted phenyl, halogen, cyano, alkoxy of one to four carbon atoms, acyl of one to five carbon atoms, acyloxy of one to five carbon atoms, allyl, $-CH_2CH_2OCH_2CH_3$, $-CH_2CH_2SO2CH_3$, $-NHC(O)H$, $-NHC(O)CH_3$, $-Si(CH_3)_3$, $-Si(OCH_3)_3$, or a cyclic $-[NC(O)CH_2CH_2CH_2]$ group; or $R^1$ and $R^2$ together are $-CH_2C(O)OC(O)-$, $-(CH_2)_2C(O)OC(O)-$, or $-CH_2C(O)OC(O)CH_2-$; each $R^3$ is independently hydrogen, alkyl of one to six carbon atoms, or phenyl; each $R^4$ is independently hydrogen, alkyl of one to six carbon atoms, phenyl, substituted phenyl, or cyano;

E is oxygen or $NR^6$ in which each $R^6$ is hydrogen, hydroxyl, phenyl, substituted phenyl, alkyl of one to six carbon atoms, or benzyl;

B is selected from $—CH_2—CH(R^5)—O—$ and $—CH_2—C(R^5)(OH)—$, in which each $R^5$ is independently hydrogen or alkyl of one to six carbon atoms;

n is about 5 to about 400;

T is hydrogen, alkyl of one to eight carbon atoms, or phenyl;

Q is $—CO_2(CH_2)_m—$, $—CONH(CH_2)_m—$, $—(CH_2)_m—$, $—CO_2C_6H_4—$, or $—C_6H_4—$, in which m is 1 to 5;

$G^\oplus$ is selected from ammonium, sulfonium, phosphonium, and iodonium; and $D^\ominus$ is selected from the group consisting of infrared absorbing cyanine anions that have a total of two to four groups selected from sulfonate groups, sulfate groups, and mixtures thereof; infrared absorbing oxonol anions; and mixtures thereof.

18. The method claim 17 in which:

$R^1$ is hydrogen or methyl;

$R^2$ is phenyl or cyano;

$R^3$ is methyl, $R^4$ is hydrogen or methyl;

$R^5$ is hydrogen, methyl, or a mixture thereof;

T is hydrogen, methyl, ethyl, or n-butyl; and n is about 10 to about 100.

19. The method of claim 18 in which x is about 30 wt % to about 98 wt %; y is about 1 wt % to about 50 wt %; and z is about 1 wt % to about 50 wt %.

20. The method of claim 19 in which:

$G^\oplus$ is ammonium; B is $—CH_2—CH(R^5)—O—$; and Q is $—CO_2(CH_2)_m—$.

21. The method of claim 20 in which the imaging step is carried out with infrared radiation.

22. The method of claim 21 in which the imageable layer consists essentially of the infrared absorbing compound.

23. The method of claim 21 in which the imageable layer additionally comprises a co-binder, a monomer, and a thermally sensitive free radical generator.

24. The method of claim 21 in which the aqueous developer is water.

25. The method of claim 21 in which the aqueous developer is fountain solution.

26. The method of claim 25 in which the imaging step and the developing step are carried out on press.

* * * * *